United States Patent [19]

Barlow et al.

[11] Patent Number: 5,433,300
[45] Date of Patent: Jul. 18, 1995

[54] BRAKE CALIPER

[75] Inventors: John Barlow, Walsall; Philip J. Smith, Sutton Coldfield, both of United Kingdom

[73] Assignee: G.K.N. Sankey Ltd., Staffs, United Kingdom

[21] Appl. No.: 211,221

[22] PCT Filed: Sep. 22, 1992

[86] PCT No.: PCT/GB92/01740
§ 371 Date: Mar. 24, 1994
§ 102(e) Date: Mar. 24, 1994

[87] PCT Pub. No.: WO93/06382
PCT Pub. Date: Apr. 1, 1993

[30] Foreign Application Priority Data

Sep. 25, 1991 [GB] United Kingdom ............... 9120369

[51] Int. Cl.6 ............................................. F16D 65/00
[52] U.S. Cl. ................................. 188/73.1; 188/370; 188/218 XL
[58] Field of Search ............ 188/73.1, 73.31, 71.1, 188/72.5, 370, 218 LX; 164/97, 98

[56] References Cited

U.S. PATENT DOCUMENTS

| 4,932,099 | 6/1990 | Corwin | 164/97 |
| 4,947,924 | 8/1990 | Morita et al. | 164/97 |
| 4,995,443 | 2/1991 | Easwaran | 164/34 |

FOREIGN PATENT DOCUMENTS

| 0440093 | 8/1991 | European Pat. Off. |
| 2950660 | 7/1981 | Germany |
| 123997 | 1/1986 | Japan |
| 151650 | 1/1987 | Japan |
| 2176725 | 1/1987 | Japan |
| 195540 | 3/1987 | Japan |
| 2087490 | 11/1980 | United Kingdom |
| 2079653 | 1/1982 | United Kingdom |
| 2219537 | 12/1989 | United Kingdom |

*Primary Examiner*—Robert J. Oberleitner
*Assistant Examiner*—Chris Schwartz
*Attorney, Agent, or Firm*—Learman & McCulloch

[57] ABSTRACT

A brake caliper has the effective modulus of elasticity of the material increased by inserting a honeycomb-like ceramic piece made of a material having a higher modulus of elasticity in a die and casting metal to fill the die, substantially encase the ceramic and substantially fill the pores of the same, and squeeze forming the molten metal to ensure substantial filling of the pores of the ceramic.

9 Claims, 3 Drawing Sheets

with a series of cut pieces of foam. The shape is then filled with a ceramic slurry, dried, and fired. The firing destroys the foam and leaves the required voids and may improve the handleability of the ceramic. The same 50% porosity is the aim, but suitable foams for this purpose with such a high degree of porosity tend to be weak, and lower levels of porosity may have to be accepted if this technique is used, for this reason

BRAKE CALIPER

This invention relates to brake calipers for so called disc brakes primarily for motor vehicles.

BACKGROUND OF THE INVENTION

DE 29 50 660—A proposes a brake caliper having cast in reinforcement parts made of a higher strength material which may be steel, hard metal or ceramic.

JP 59-123997—A provides a rocker arm made as an aluminium alloy casting with a sintered body of porous ceramics disposed in the pad position of the rocker arm, and made by locating the sintered body into the mould and filling the mould with molten alloy under high pressure and maintaining the pressure until the alloy solidifies.

The designer of a brake caliper is particularly concerned to provide stiffness, so that when the brake pads are forced against the disc the caliper will not deform under load and hence reduce or vary the pad pressure distribution. The problem in providing adequate stiffness is due to the overall limitations of space availability especially when the caliper is within a wheel, as well as the restrictions of available materials on inherent stiffness, cost and weight limitations.

For high duty purposes, for example racing car brakes, the caliper is usually made of an aluminium alloy or a so-called composite material in which particles or fibres of silicon carbide or the like are distributed uniformly through the metal: this composite-material does indeed have an improved modulus of elasticity but is extremely difficult to machine because the silicon carbide is not only stiffer but is extremely hard and tends to damage cutting tools. The cutting rates, lubricant requirements and so forth for the aluminium matrix and ones which might suit the silicon carbide are widely different.

The object of the invention is to provide improved stiffness whilst enabling the necessary machining to be carried out.

SUMMARY OF THE INVENTION

According to the present invention, a brake caliper comprises a light alloy casting incorporating one or more reinforcements made of a material having a higher modulus of elasticity than that of the light alloy and surrounded by the light alloy, and is characterised in that the reinforcements are of honeycomb-like ceramic which is impregnated with the alloy by squeeze-forming the molten metal in the casting die, and in that said reinforcements are located in areas of the cast caliper where machining is not required.

Squeeze forming is a technique developed by GKN Technology Limited and which, for the purposes of the present invention, comprises making a metal casting in matched punch and die and applying continuing pressure to the metal in the die during the solidification of the molten metal. This avoids cavities from shrinkage, and may give improved grain structure. The quality of the cast component may approach that of a forged component when squeeze forming is used.

According to the invention from a second aspect, a brake caliper comprises a light metal alloy casting incorporating a honeycomb-like ceramic insert impregnated with the alloy, the insert being located in positions where machining is not required. Because the insert is of a discrete shape, instead of being distributed uniformly throughout the whole of the material from which the caliper is made, the problem with machining can be avoided.

Preferably both features are employed in a single caliper, that is to say the ceramic insert is used in a squeeze formed casting.

The ceramic insert may be made in various ways.

According to one possibility, ceramic particles are formed into a shape by pressing in a die preferably followed by a heat treatment to fuse the particles into the shape. The particles may be screened before pressing to reject unacceptably small particles or fines that pass through the screen so as to control particle size; and thus the resultant volume percentage of voids produced in the ceramic insert. Preferably the voids total of the order of 50% of volume of the shape, although lower values of voids are also useful.

According to a second possibility, a porous foamed resin shape is created for example by moulding the foam, or by cutting from a sheet or block of foam, and/or by building up a shape from a series of cut pieces of foam. The shape is then filled with a ceramic slurry, dried, and fired. The firing destroys the foam and leaves the required voids and may improve the handleability of the ceramic. The same 50% porosity is the aim, but suitable foams for this purpose with such a high degree of porosity tend to be weak, and lower levels of porosity may have to be accepted if this technique is used, for this reason A third possibility is to cast a slurry mix of ceramic and a lower melting point material, dry the casting, machine it (if required) to the final shape, and then fire it to melt out all the low melting point component of the original mix and leave the required porous ceramic shape.

Other methods of creating the porous ceramic may be used.

The object of the ceramic is to add material of a higher modulus of elasticity than that of the metal. The ceramic may be of a lower weight so that stiffness is increased without increasing weight, or even if it is of a higher specific gravity, it is only added in discrete areas and not over the whole of the casting and consequently advantage may still be attained.

Aluminium and its alloys typically have a modulus of elasticity of about 70–75 whereas alumina has a modulus of about 300: these figures however are at typical temperate zone ambient day temperatures, whereas racing car brakes often run at over 200 deg.C. At such elevated temperatures the modulus of the alloy drops sharply, for example halves, whereas that of alumina is hardly affected.

Other possible ceramics for use in the invention are alumina-zirconia, alumina-silicate, silica nitride and silicon carbide. The selected material is to be one which does not dissolve in the casting metal during the casting process which may involve considerations of both time, temperature and pressure, so as to avoid dispersion of the ceramic in the metal, but otherwise the higher the modulus, when all other parameters remain the same, the better the result. At present the inventors prefer the combination of aluminium and alumina.

The ceramic form is suitably shaped and dimensioned to be supported in the die so that its porosities become filled with the metal during the casting and squeeze forming process.

The ceramic form is to be located in positions in the caliper avoiding areas which are to be drilled or otherwise machined so that any machining processes carried out are only on the alloy and not on the ceramic.

Experimental results show that a brake caliper made in the manner herein described with the squeeze-formed metal casting and a ceramic insert having about 30% voids before location in the casting had a modulus of elasticity increased by some 40%.

THE DRAWINGS

One embodiment of the invention is now more particularly described with reference to the accompanying drawing wherein.

DETAILED DESCRIPTION

Figure 1:
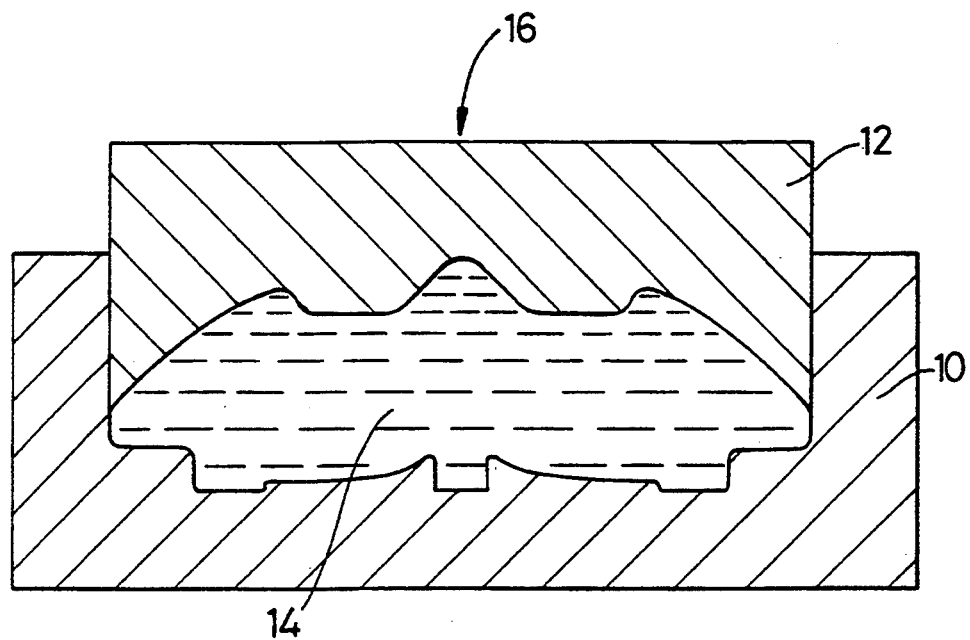
FIG. 1 is a somewhat diagrammatic and sectional elevation showing squeeze forming carried out on a brake caliper casting.

Turning now to the drawings, FIG. 1 shows the basic squeeze forming technique in which a mould part 10 is formed with one half of the shape of the required casting and a mould part 12 is formed with the other half of the required shape, the space 14 therebetween is injected with the molten material, in the present case with the ceramic preforms inserted therein, and pressure is applied in the direction of the arrow 16. Squeeze forming is a technique well known per se and needs no further description in the specification.

Figure 2:
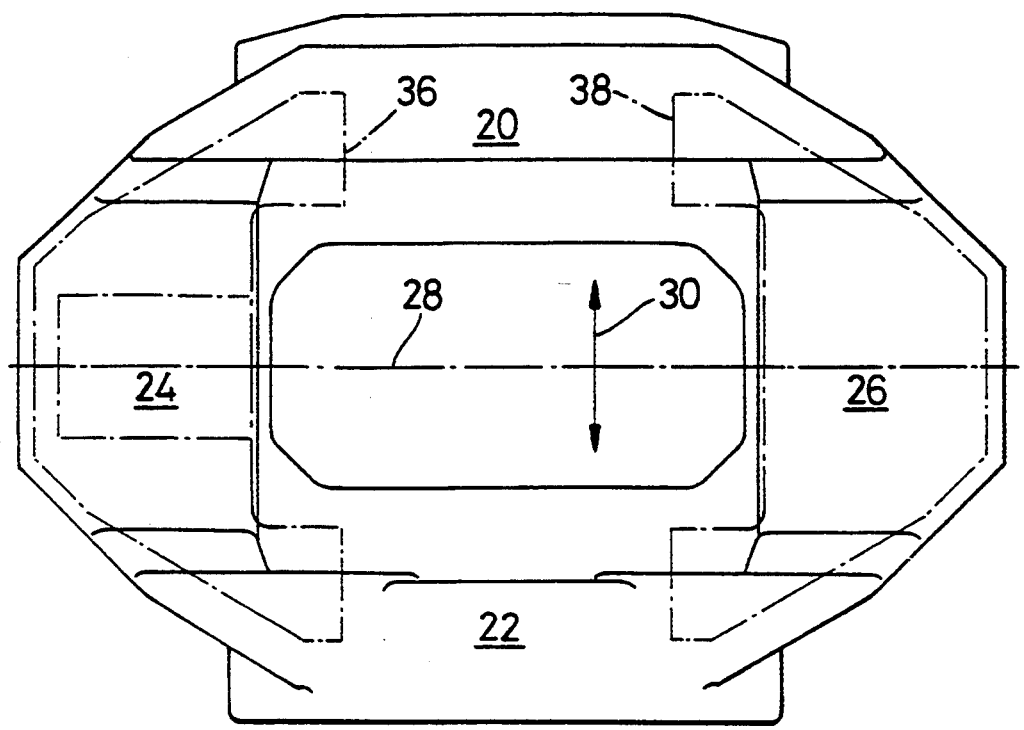
FIG. 2 is a plan view of a typical brake caliper casting.
Figure 3:
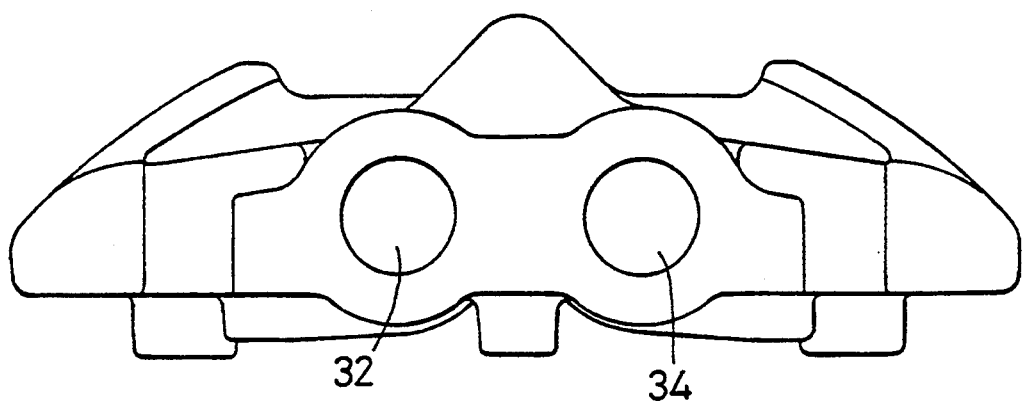
FIG. 3 is an elevation of the same from one side.
Figure 4:
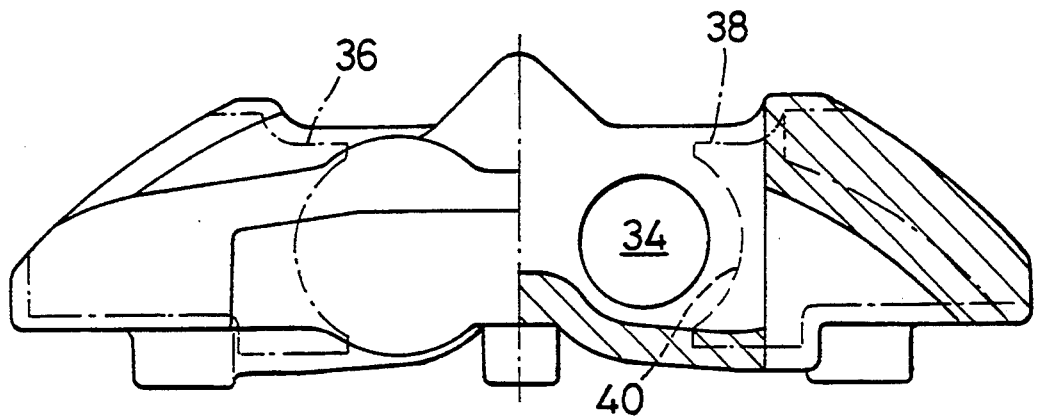
FIG. 4 is a part sectional elevation and also showing the other side.

Turning now to FIGS. 2 to 4, these show a typical brake caliper for a racing car, but some of the finer points in machined holes for example to fix the caliper in position are omitted from the drawing in the interests of clarity. Essentially the caliper comprises a loop with two sides generally indicated by the references 20 and 22 which lie on opposite sides of the plane P which is the plane of the brake disc. These sides are joined by ends, generally indicated by reference numerals 24 and 26 and the ends straddle the disc so as to connect the two sides together. As well understood by those skilled in the brake design art, brake pads of suitable friction material are located against the face of the disc and urged against the disc by hydraulically displaced pistons and the reaction attempts to force the sides apart in the directions of the arrows 30.

The bores which receive the hydraulic components are indicated by the reference numerals 32 34 in FIG. 3.

In this instance two separate but identical ceramic components are provided, shown in plan view in FIG. 2 by the chain dot lines and indicated by the reference numerals 36 38. The same reference numerals are used in FIG. 4 indicating the profile of the inserts.

Figure 5:
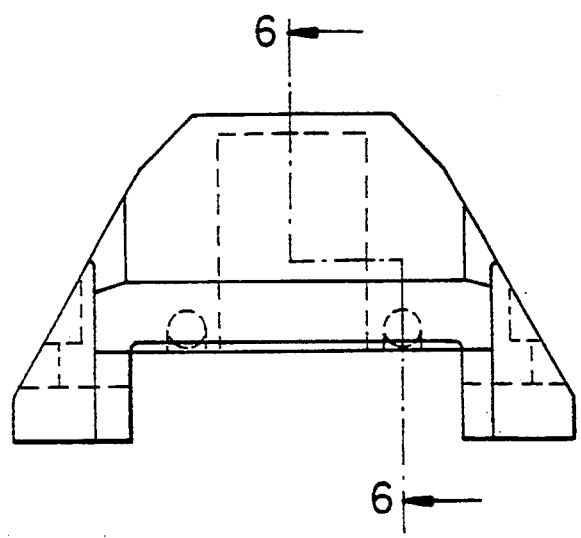
FIG. 5 is a plan view of a ceramic component
Figure 6:
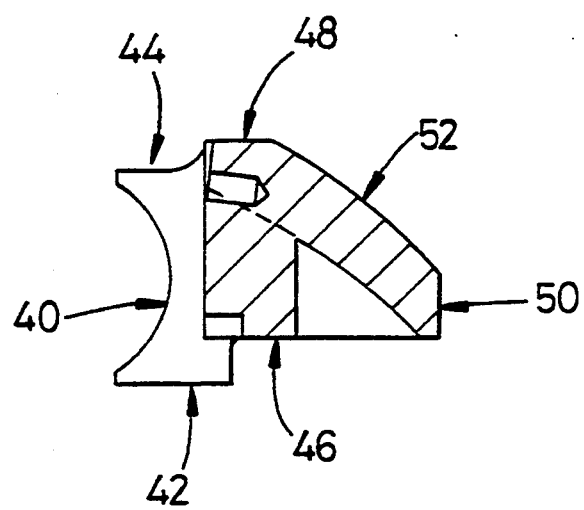
FIG. 6 is a section taken on the line 6—6 of FIG. 5.
Figure 7:
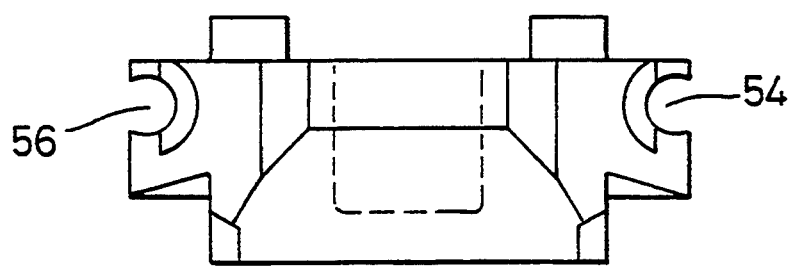
FIG. 7 is an end elevation of the component of FIGS. 5 and 6

Turning next to FIGS. 5 to 7, the precise shape of a relatively complex insert as used in FIGS. 2 to 4 is illustrated. The arc 40 FIG. 6 is also seen in FIG. 4 and is concentric to the bore 34 which is to be machined in the casting but leaving a substantial thickness of cast metal about that machine bore in order to contain hydraulic pressure. At other points, for example on the surfaces 42-50 FIG. 6 the insert is to be encased by relatively thinner areas of solid cast metal as seen in FIG. 4, and on the surface 52 FIG. 6 the insert lies closest in relation to the surface of the casting.

In general, in all areas where precision machining is to be carried out on the caliper, the ceramic is shaded to clear the machining, for example in the areas 54 56 FIG. 7. Preferably the insert is arranged to make line contact with the die in places where machining is inessential, for the purpose of locating the insert in the die.

We claim:

1. Brake caliper construction comprising:

a squeeze-formed casting of light alloy metal material having a predetermined modulus of elasticity and predetermined areas thereof designated to receive secondary machining by a machine tool following casting and adjacent areas known not to require such secondary machining;

at least one preformed porous ceramic honeycomb insert cast in place within said casting having a modulus of elasticity relatively greater than that of said light alloy metal and being impregnated with said light alloy material as a result of the squeeze casting process, and wherein said at least one insert is shaped and located within said adjacent areas in spaced relation to said predetermined areas so as to avoid being contacted by the machine tool during the performance of secondary machining on said predetermined areas.

2. The construction of claim 1 wherein said casting includes a pair of laterally spaced side portions for location on opposite sides of a brake disc and a pair of spaced end portions interconnecting said side portions for straddling the disc, and at least another preformed porous ceramic insert, said inserts are symmetrical in configuration and provided in each of said end portions in spaced relation to one another.

3. The construction of claim 1 wherein said insert comprises a plurality of discrete ceramic particles pressed-formed to shape and having a predetermined volumetric percentage of voids that renders said insert porous.

4. The construction of claim 1 wherein said insert is constructed according to a lost foam process in which a slurry of ceramic material is introduced into voids of a preform foamed material and the slurry and preform thereafter are heated sufficiently to destroy the preform and harden the slurry to produce a resultant ceramic insert having a predetermined volumetric percentage of voids.

5. The construction of claim 4 wherein said preform is constructed from individual sheets of the foamed material joined to one another and formed to the required shape.

6. The construction of claim 4 or 5 wherein said insert has at least 20% voids.

7. The construction of claim 4 or 5 wherein said insert has at least 30% voids.

8. The construction of claim 4 or 5 wherein said insert has at least 40% voids.

9. The construction of claim 4 or 5 wherein said insert has at least 50% voids.

* * * * *

UNITED STATES PATENT AND TRADEMARK OFFICE
CERTIFICATE OF CORRECTION

PATENT NO. : 5,433,300
DATED : July 18, 1995
INVENTOR(S) : John Barlow et al

It is certified that error appears in the above-indentified patent and that said Letters Patent is hereby corrected as shown below:

Column 4, line 8, change "shaded" to —shaped—.

Signed and Sealed this

Seventh Day of November, 1995

Attest:

BRUCE LEHMAN

Attesting Officer

Commissioner of Patents and Trademarks